United States Patent [19]

Wright

[11] Patent Number: 4,757,379
[45] Date of Patent: Jul. 12, 1988

[54] APPARATUS AND METHOD FOR ACQUISITION OF 3D IMAGES

[75] Inventor: Daniel W. Wright, Urbana, Ill.

[73] Assignee: Contour Dynamics, Champaign, Ill.

[21] Appl. No.: 51,206

[22] Filed: May 18, 1987

Related U.S. Application Data

[63] Continuation-in-part of Ser. No. 851,718, Apr. 14, 1986, abandoned.

[51] Int. Cl.[4] .................. H04N 13/00; H04N 7/18
[52] U.S. Cl. .................................. 358/88; 358/107; 356/1; 356/12; 356/397; 356/376
[58] Field of Search ............... 358/88, 107; 356/12, 356/19, 375, 376, 397, 380, 152, 1

[56] References Cited

U.S. PATENT DOCUMENTS

| | | | |
|---|---|---|---|
| 3,324,238 | 2/1964 | Stavis | 358/88 |
| 3,564,133 | 2/1971 | Hobrough | 250/220 |
| 3,635,551 | 1/1972 | Szymber | 353/101 |
| 3,636,551 | 1/1972 | Maguire | 340/752 |
| 3,682,553 | 8/1972 | Kapany | 356/4 |
| 3,705,261 | 12/1972 | Langley | 358/88 |
| 3,866,052 | 2/1975 | Di Matteo et al. | 250/558 |
| 3,908,077 | 9/1975 | Stert et al. | 358/107 |
| 3,912,856 | 10/1975 | Liddel | 358/88 |
| 3,986,774 | 10/1976 | Lowrey, Jr. et al. | 356/3 |
| 4,175,862 | 11/1979 | Di Matteo et al. | 356/156 |
| 4,259,589 | 3/1981 | Di Matteo | 250/558 |
| 4,305,095 | 12/1981 | Dallas | 358/88 |
| 4,335,962 | 6/1982 | Di Matteo et al. | 356/376 |
| 4,457,625 | 7/1984 | Greenleaf et al. | 356/1 |
| 4,480,919 | 11/1984 | Asano et al. | 356/1 |
| 4,525,858 | 6/1985 | Cline et al. | 382/1 |

OTHER PUBLICATIONS

Manufacturing Engineering, *Machine Vision*, Feb. 1984, pp. 45–47, 49–50, 53–54, and 56–60.

*Primary Examiner*—James J. Groody
*Assistant Examiner*—John K. Peng

[57] ABSTRACT

Apparatus for acquiring digital data corresponding to a 3D object, incorporates a frame located in proximity to the 3D object in no fixed positional relationship therewith, a shutter for scanning the object with a shadow line, and apparatus for deriving signals corresponding to the position of the shadow line following on the 3D object.

15 Claims, 7 Drawing Sheets

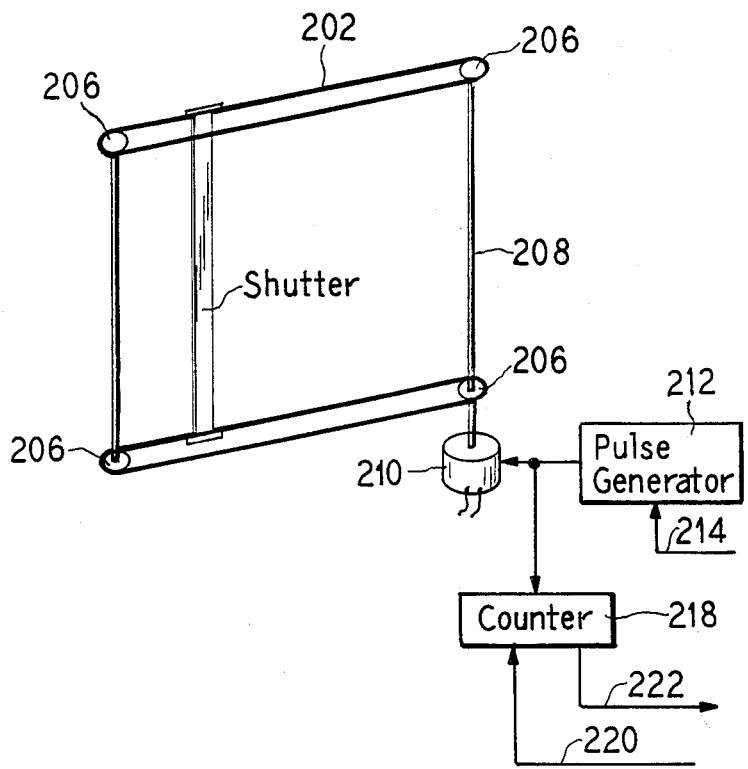
FIG. 15
FIG. 14
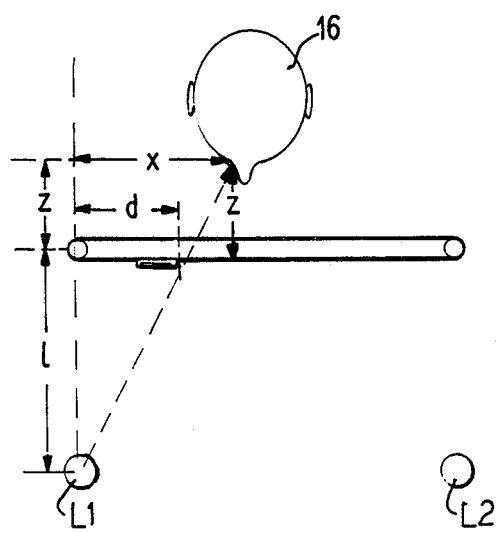

APPARATUS AND METHOD FOR ACQUISITION OF 3D IMAGES

This is a continuation-in-part of application Ser. No. 851,718, filed Apr. 14, 1986, now abandoned.

BACKGROUND

1. Field of the Invention

The present invention relates to apparatus and methods for acquiring 3D visual images, and more particularly to an apparatus and method for acquiring such images by scanning techniques.

2. Prior Art

In the prior art, a number of methods have evolved for scanning the surfaces of objects such as the surface of the earth for map making and the like. These techniques are generally employed to produce two-dimensional images from three-dimensional objects, with compensation for different elevations of surface features.

These processes have not been well adapted to the scanning of three-dimensional images such as the human body or the like, in a studio-type environment. It is desirable to acquire data corresponding to a three-dimensional image for the purpose of being able to visual display a selected angle of view of the image on a video display terminal, with manipulation of the color or other appearance parameters of the image in a controlled manner. In this way a variety of images with different parameters may be displayed, without requiring actual modification of the real three-dimensional object.

BRIEF DESCRIPTION OF THE INVENTION

It is a principal object of the present invention to provide a simple and effective method and apparatus for acquiring a three-dimensional image such as the head or face of a human being.

Another object of the present invention is to provide a method and apparatus for allowing the scanning of a three-dimensional object to obtain accurate coordinates of points on the surface of such object, without requiring rigorous placement of the object at any particular position within a field of view.

A further object of the present invention is to provide such an apparatus and method which can accomplish the scanning of a three-dimensional object during a relatively short time period, after which the object may be displayed on a video display terminal from a selected angle of view.

In accordance with one embodiment of the present invention, there is provided a frame comprising a rectangular opening, with a reference surface parallel to the frame located a fixed distance behind it. Scanning apparatus is provided for scanning with a light beam the reference surface and a three-dimensional subject positioned behind the frame opening. The visual image is exposed to a television camera, or the like, which records the scanned image in a sequence of scanning frames together with the portion of the reference surface which intercepts the scanning beam. The angle of the scan relative to the plane of the frame opening is determinable by the illuminated portion of the reference surface, and this information is employed to develop three-dimensional coordinates from each point on the scan line visible during each scanning frame.

The present invention makes it easy to acquire data corresponding to the three-dimensional image of a subject's head and face when the subject is positioned behind the frame opening, with the reference surface is positional within the field of view. The head and face of the subject is quickly scanned with a beam of light confined to a plane which rotates about an axis parallel to the plane, to illuminate successive lines of the subject during successive instants in time. A plurality of scanning cycles may be made from a plurality of angles, and the visual image of each scanning cycle recorded in a plurality of scanning frames. Each scanning frame records the portion of the subject's head which is illuminated by the scanning beam, and the points at which the scanning beam strikes the edge of the frame opening and the reference surface. These points determine the angle of scanning to enable three-dimensional resolution of each scanned point of the subject's face.

In the use of the present invention, it is possible to acquire a three-dimensional image of a person's head, and thereafter to display the person's head or face from a variety of angles, with the introduction of modifications such as to represent the effect of various cosmetics on the face, the visual effect of various hair styles superposed on the image, and/or the effects of any prospective plastic or reconstructive surgery, etc.

These and other objects and advantages of the present invention will become manifest by inspection of the following description and accompanying drawings.

BRIEF DESCRIPTION OF THE DRAWINGS

Reference will now be made to the accompanying drawings in which

FIG. 14 is a plan view of an alternative embodiment; and

FIG. 15 is a perspective view of an alternative shutter.

DESCRIPTION OF THE PREFERRED EMBODIMENTS

Figure 1:
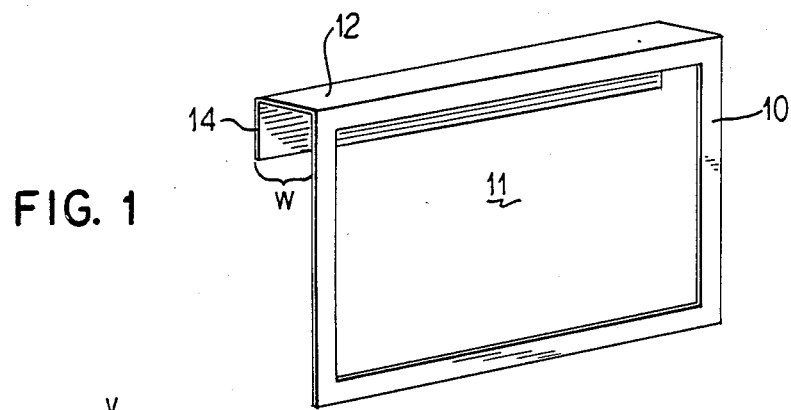
FIG. 1 is a perspective view of a frame opening used for acquiring the visual image of a subject.
Figure 2:
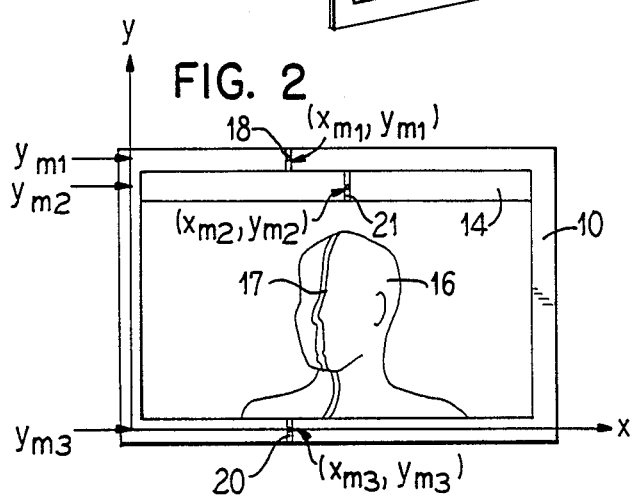
FIG. 2 is a front view of the frame opening of FIG. 1, with a subject in position, the subject being scanned by a planar scanning beam.
Figure 3:
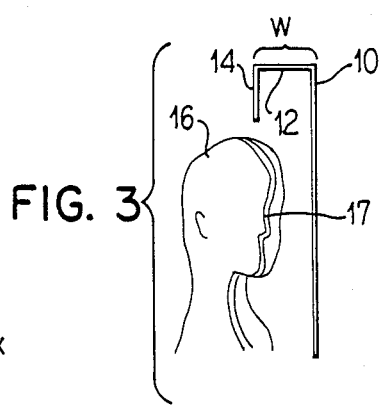
FIG. 3 is a side view of the frame opening and subject of FIG. 2.

Referring now to FIGS. 1 to 3, a frame 10 is illustrated in perspective view in FIG. 1 which consists of a hollow rectangle enclosing an open area 11. At the top of the frame 10, an upper wall 12 is provided connected to a rear screen 14 or reference surface which is parallel to the frame 10 at a fixed distance behind it indicated as W in FIG. 1.

FIG. 2 illustrates the subject in position behind the frame and aligned with the screen as illustrated in FIG. 3. The subject is scanned by a planar beam generated by a cylindrical light source, with the beam rotating about an axis parallel to the beam. This causes the beam to illuminate a thin strip 17 or line of the subject, as indicated in FIG. 2. This line moves transversely across the subject and illuminates not only a bright line 17 on the subject being scanned, but also short lines 18 and 20 on the upper and lower portions of the frame 10, and a short line 21 on the screen 14. Only one point on each of the short lines 18, 20 and 21 is of significance. Such point may conveniently be taken as the midpoint of the short lines 18, 20 and 21, or an end point of each of the lines.

While the subject is being scanned in the manner illustrated in FIG. 2, the image is acquired by a television camera 13, which views the entire frame 10, including the subject within the frame 16 to produce scanning frames or individual data blocks at the rate of thirty times per second, or more frequently, depending on the scanning frequency of the camera. The camera produces electrical signals corresponding to the illuminated areas within the field being scanned, namely the illuminated bright line 17 of the subject 16, and the short lines 18, 20 and 21. The physical location of these short lines relative to the line of sight of the camera is determinable by the time during each horizontal scan line of the video camera in which a pulse indicates the prescence of light within the field being scanned.

Assuming that the video camera performs scanning by horizontal scan lines beginning with the top and progressing toward the bottom, the top of the frame is the first illuminated area encountered, so that the first pulses produced during scanning of the image originate when the short line 18 is scanned. The horizontal position of the short line 18 within the field of view is determined by the time within each horizontal scan line that the pulse appears, and the vertical position of the upper end of the line 18 is determined by the ordinal position of the scan line during which the first pulses occurs.

As scanning by the video camera proceeds down through the field of view, a point is reached at which the line 18 is no longer being scanned, but the line 21 is being scanned. The vertical position of the line 21 is indicated by the ordinal position of the horizontal scan line (or the line number) during each raster which produce the pulses corresponding to the line 21, and the horizontal position of the line 21 is determined by the time within each of such scan lines that the pulse corresponding to the line 21 occurs.

As the scanning continues downwardly, a gap is reached between the line 21 and the upper extremity of the bright line 17 on the subject 16. Following this, the next output pulse indicates the upper extremity of the bright line 17, and the horizontal positions at which a scanning line crosses the bright line 17 is determined by the times of the output pulses produced during such scan lines. These times vary, corresponding to the contour of the subject, as indicated in FIG. 2. A short gap may appear when the scanning proceeds downward into the chin area, after which the bright line reappears and continues downwardly to the bottom of the frame. At the bottom of the frame, the short line 20 is scanned, and the last output pulse is produced by the television camera during a scanning correspond to the position of this line.

The midpoints of the short lines 18, 20 and 21 may be determined by averaging the ordinal numbers of the successive horizontal scanning lines during which the pulses corresponding to such lines appear. Alternatively, the last line to indicate the presence of the lines 18, 20 and 21 may be taken as indicating the vertical positions of such lines. Under normal circumstances, the position of the camera relative to the frame 10 is fixed, so the vertical positions of the short lines 18, 20 and 21 do not vary. In addition, as long as the camera is aligned so that the scanning lines are parallel to the horizontal dimensions of the frame 10, the horizontal positions of the lines 18 and 20 will always be the same, so that one of them can be ignored. However the horizontal distance between the position of the line 18 and 21 is indicative of the angle of the light source relative to the camera. For example, for angles of incidence (relative to the frame opening) near 90°, the lines 18 and 21 are nearly aligned, horizontally, whereas they are found to be further apart for lower angles of incidence. Thus, by analyzing the horizontal distance between the positions of the short lines 18 and 21, the angle of each field scanned by the television camera can be determined and used for resolving the z dimensions of points along the observed bright line 17.

Figure 4:
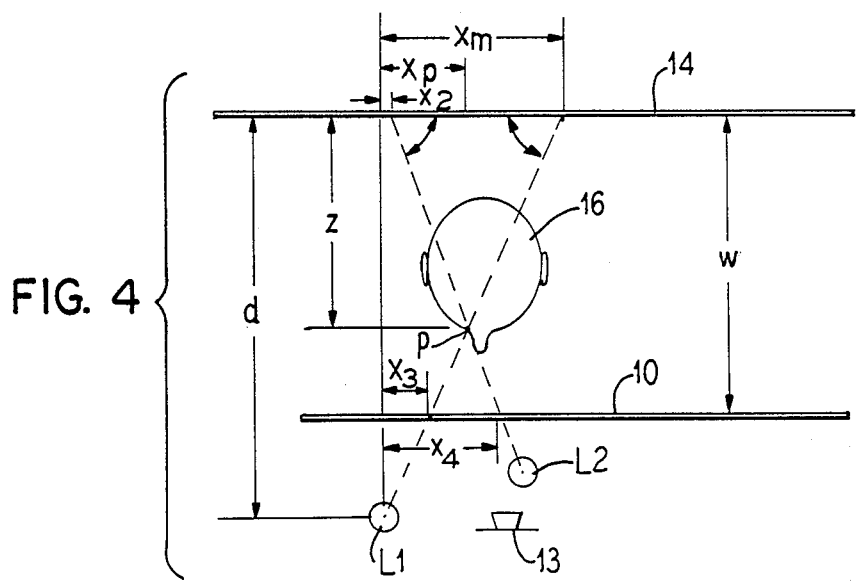
FIG. 4 is a top view of a subject (in cross-section) with a plurality of scanning beam sources, indicating dimensions which are relevant in interpreting the scanning frames in order to resolve the images into three-dimensional data.

When the position of the axis of the light source is known, relative to the reference surface 14, then the angle of the scanning beam, relative to the plane of the frame opening of the frame 10, is determined by the horizontal position at which the beam strikes the reference surface 14, i.e., the horizontal position of the short line 21. Then for any point along the bright line 17, the z dimensions of such point (from the reference surface toward the frame opening) is:

$$z = \left(1 - \frac{x}{x_m}\right)d$$

where x is the horizontal position of such point within the scanning frame, $x_m$ is the horizontal position of the short line 21, and d is the distance between the axis of the light source and the reference screen. FIG. 4 illustrates these dimensions for a subject 16 exposed to a scanning beam from a light source L1. The point P is on the bright line 17. The dimensions x and $x_m$ are measured from a line formed by the intersection of the reference screen 14 with a plane normal to it passing through the axis of the light source, the position of which is indicated when the lines 18 and 21 are aligned. The parameter d is a constant determined by the position of the light source, and $x_m$ is a constant for each scanning frame, determined by the angle of incidence of the scanning beam on the plane of the opening 11.

By this calculation, using the variable x, the z dimension of any point on the bright line 17 may be determined, during a single scanning frame captured by the video camera. When all of the scanning frames, acquired during a single cycle of rotation of the scanning beam (i.e., a single scanning cycle is processed), then the z dimension for every point on the subject's face is known, provided that all points are illuminated during the cycle. All points which are not so illuminated may be processed, to find their z dimensions, by executing another cycle of rotation of the scanning beam, with the light source placed at a different position, and with the subject 16 in the same position. The above calculation is then carried out again for the additional points, using the applicable values of $x_m$ and the value of d which may be the same or different, depending on the new position of the light source.

The z dimension may also be determined, independently of the position of the light source, because it is equal to one minus the ratio of the difference in horizontal distance between P and one of the short lines 18 or 20, to the distance between the short lines 18 and 21, multiplied by the distance between the frame 10 and the reference surface 14. If desired, two scanning cycles may be executed with the subject in the same position. When each point on the subject's face is scanned successively with light sources located at different positions, then for every point on the subject's face, there will be two scanning frames at which such point is illuminated from two different angles. The values of the two angles at which a given point is illuminated may be employed to calculate the z dimension of such point, in the direction normal to the plane of the frame 10. The x and y dimensions of the point are determined directly from the output of the video camera. The y dimension corresponds to the ordinal number of the scan line at which such point is scanned, and the x dimension corresponds to the time following the start of such scan line at which the point is reached.

Referring to FIG. 4, the z dimension of any point P on the subject 16 may be determined by using either of two cycles of scanning by light sources L1 and L2, placed at arbitrary positions relative to the plane of the frame 10. The point P is illuminated by two light sources L1 and L2 during successive cycles of rotation of the scanning beams. The dimension W is the fixed distance between the frame 10 and the reference screen 14. The z dimension (measured from the reference screen 14) of the point P is $$z = \left(1 - \frac{X_m - X_p}{X_m - X_3}\right) \times w$$

for any scanning cycle. Thus the z dimensions for each x, y point within the field of view is determined. For points not illuminated by both beams, for example, because of the shadow cast by the subject's nose, the z dimension of those points may be determined by the single scanning cycle which illuminates such points.

Parameters relating to the color of the surface of the subject at each point are determined by the outputs of the video camera when such point is scanned by the camera. These outputs are conveniently in the form of R, G and B signals, corresponding to the intensities of red, green and blue light at such point. These signals define the intensity, hue and purity of the color at such point.

It is thus possible to develop the z coordinates and color parameters from every point of the surface of the subject during one or more scanning cycles. Then, with the x, y z positions and the color parameters of each point being known, they may be used to generate a two-dimensional image on a video display terminal, illustrating a view of the three-dimensional subject from any desired angle in elevation and azimuth. Such a two-dimensional image can conviently be displayed by generating, on the display, a point with the appropriate color for that point as the image appears from the selected angle of view. The color at any given point, or area, may be modified by conventional color retouching techniques, to illustrate the effect of various cosmetics on the face of the three-dimensional subject.

It is feasible to demonstrate the appearance of the subject's face with a variety of hair styles. The hair style is represented by stored data in the form of a matrix of records defining points on a surface corresponding to a selected hair style, with appropriate colors therefor. The hair style is displayed simultaneously with the subject's face by displaying the colors of the points corresponding to the selected hair style in place of the colors of those points for which data was acquired during the scanning process.

The shape of the subject's features may be changed by manually entering altered x, y, z coordinates for various points of the image, such as the length of the subject's nose or the width of his brow, etc.

Alternatively, instead of manually entering data on a point-by-point basis, the positions of groups of points may be altered in a defined way by the application of a suitable program for manipulating the x, y, z coordinates of the points of such group. In this way, for example, a bump may be smoothed out (or averaged), so that the displayed image displays the appearance of the object without the bump.

The displayed image may be altered in a variety of ways, to illustrate different conditions, so that such conditions may be visualized before they are undertaken on a live three-dimensional subject.

FIG. 4 illustrates the simple case in which the scanning light beam is parallel to the vertical dimensions of the frame 10. If the scanning beam is not parallel to the frame, then the x positions $x_m$, $x_2$, $x_3$, and $x_4$ of the short lines 18 and 20 must both be taken into account. Since these points, one on each of the three short lines 18, 20 and 21, define a plane fixed in relation to the frame 10, the z dimension of the single point p illuminated by a plane forming any selected angles with the frame 10 is calculated in substantially the same manner as indicated in connection with FIG. 4.

When the scanning beam is not parallel to the vertical side of the frame, then the locus of a horizontal line, in the plane of the scanning beam and passing through the point p is calculated. This is done for each scanning beam, if more than one is used, to insure that all points are illuminated, and the lines thus calculated correspond to the beams shown in FIG. 4, from the light source L1 and L2. Thereafter, the analysis described above in connection with FIG. 4 may be carried out in order to derive the z dimension of the point p. The plane of each beam is defined by $$z = a_i x + b_i y + c_i$$

where $a_i$, $b_i$ and $c_i$ are constants which define the plane passing through the point x, y, z. In each scanning frame, three points of the plane of the scanning beam are illustrated by the short lines 18, 20 and 21. The x and y positions of each of these points is recorded by the video camera in the scanning frame (indicated by the ordinal position of the horizontal scanning line through such point and the location of such point along that horizontal line), and the z dimension of the three points are all known. The z dimension of the short line 21 is 0 and z dimension of both short lines 18 and 20 is W, as shown in FIG. 4. Thus the constants $a_i$, $b_i$ and $c_i$ may be evaluated for the plane in each scanning frame, by the straight forward solution of three simultaneous equations, corresponding to the three known points. Then the z dimension of any point on the bright line in such frame may be calculated directly from the equation for that plane.

These calculations are carried out for spaced points on each horizontal line of the scanned field of view. The horizontal spacing of the points thus treated is dependent only on the resolution which is required in the final image. The vertical resolution is limited to the spacing of the scan lines of the television camera with which the field of view is scanned, but this spacing may be selected to provide any desired accuracy either by making the scan lines as close together as desired, or by scanning the field of view with interlaced scan lines in which successive frames have scan lines which are intermediate of each other.

The arrangement of FIGS. 1 to 3 requires apparatus for generating a scanning beam in the form of a thin plane. Such a beam can be generated by using a point source with a reflector in the form of a parabolic cylinder. Alternatively, a line source may be used, with an elongated cylindrical condensing lens and/or a mask with a slit which passes only a thin plane of light.

In an alternative arrangement, which will now be described, the need for a highly concentrated thin scanning beam is eliminated, and simple point sources may be used instead.

Figure 5:
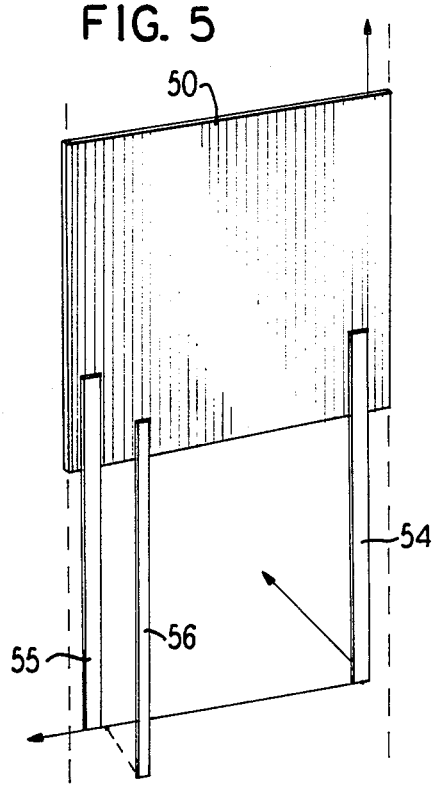
FIGS. 5 and 6 are three-dimensional views of a mechanism employed in the acquisition of image employing a moving screen shutter.
Figure 6:
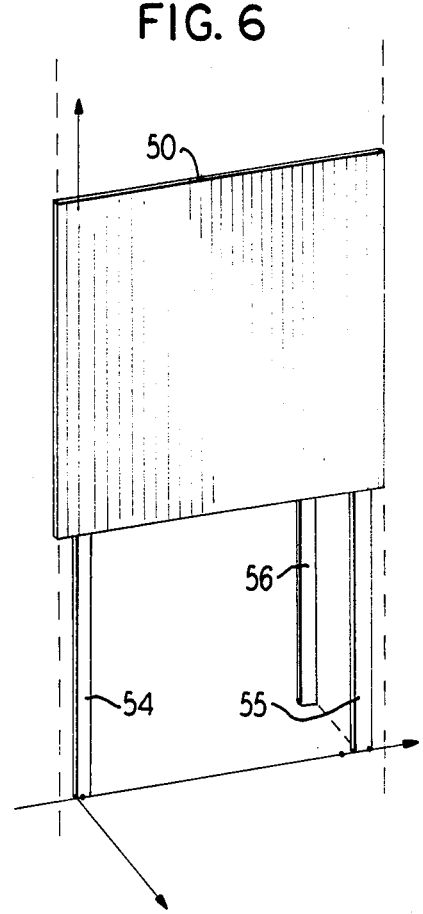

FIGS. 5 and 6 show rear and front prospective side views in which the frame 10 of FIGS. 1 to 3 is replaced by moving shutter 50. The shutter is adapted to move in a vertical direction, to gradually cover the field of view of the subject 16. A light source L1 in the form of a point source, which may be a simple electric lamp located a distance away from the shutter 50, is located above the level of the subject 16, and a video camera 54 is located on approximately as the same level as the subject 16.

Figure 7:
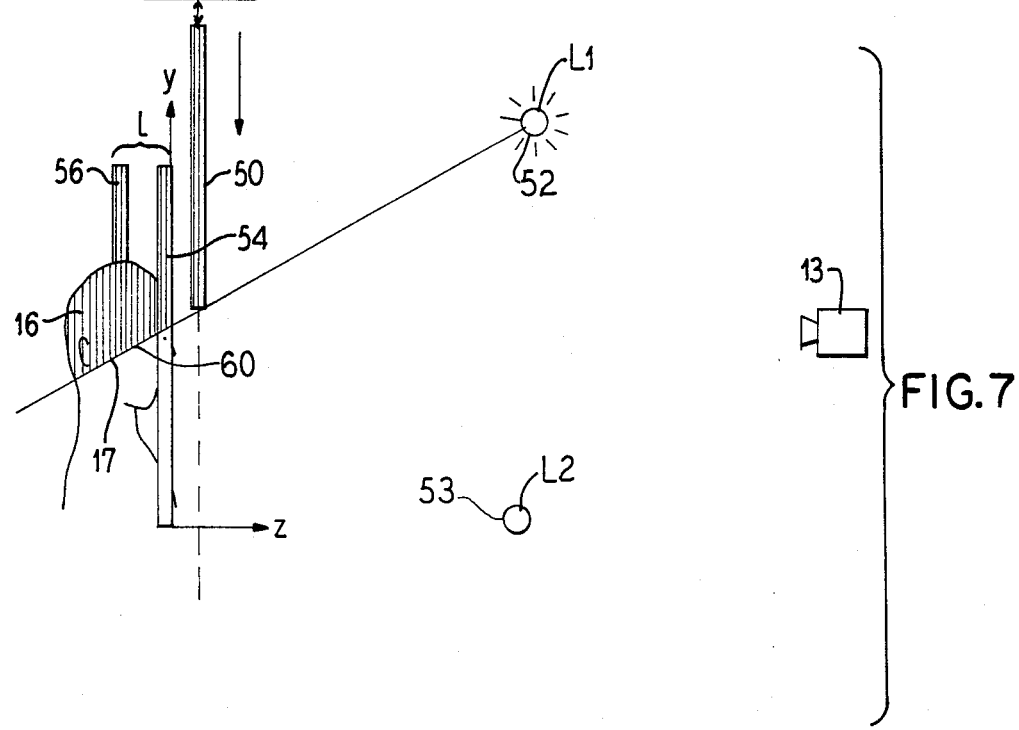
FIGS. 7 and 8 are side views of a subject being scanned behind the shutter of FIGS. 5 and 6, at different positions of the shutter during a scanning cycle.

As illustrated in FIG. 7, the shutter moves downwardly, and casts a shadow over the front surface of the subject 16. The shadow forms a sharp edge defining a sharp distinction between light and dark on the subject 16, and this sharp edge is observed by the camera 54 as the shutter moves downwardly in front of the subject 16.

A pair of frame bars 54 and 55 are located behind the shutter 50, in the vicinity of the front surface of the subject 16, and a third reference bar 56 is located at one side of the subject 16, spaced behind the frame bars 54 and 55.

Figure 9:
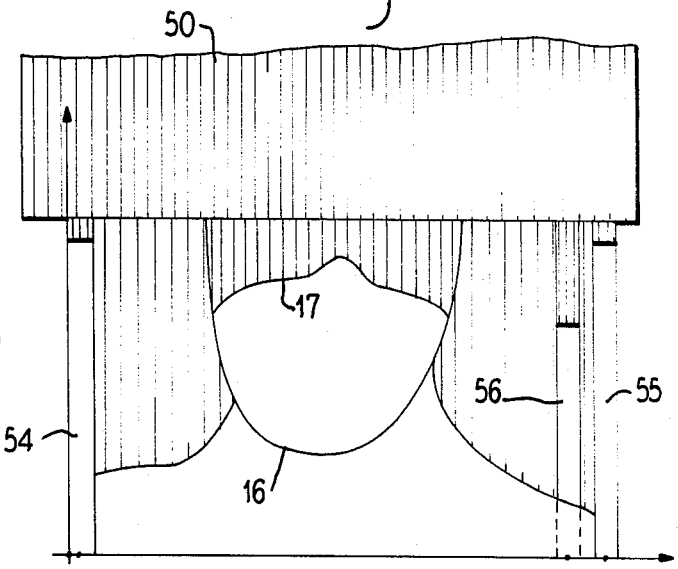
FIGS. 9 and 10 are front views of the subject being scanned by the shutter at the positions illustrated in FIGS. 7 and 8.
Figure 10:
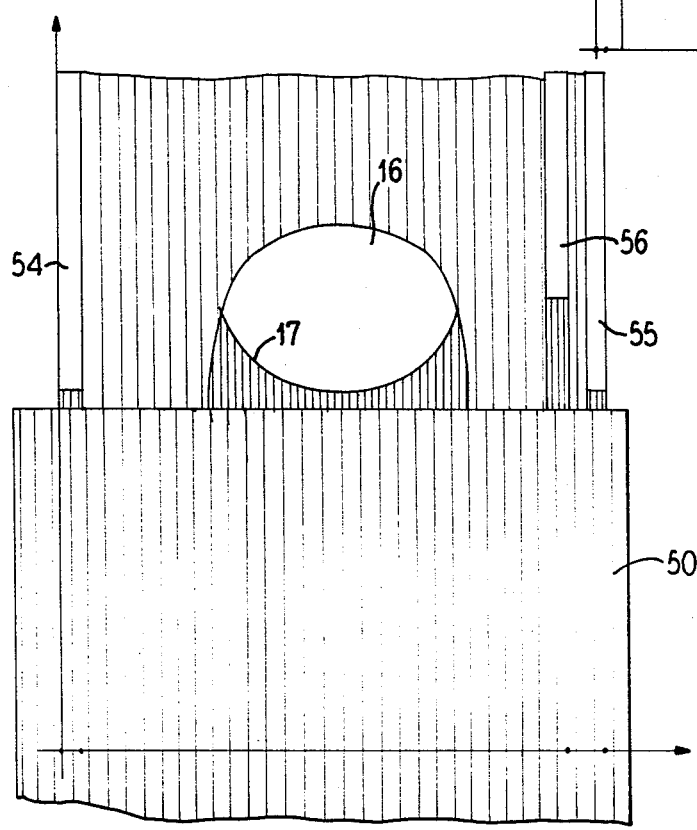

The frame bars 54 and 55 define a plane having the same significance as the plane of the frame 10 of FIGS. 1 to 3. Likewise, the reference bar 56 corresponds to the reference screen 14 of the arrangement of FIGS. 1 to 3. A shadow line appears on each of the bars 54–56, and a plane is defined by the three points corresponding to a point on the shadow line on each of the reference bars 54–56. The reference bars 54–56 may be made as thin as necessary, so that when the reference bars are scanned by the video camera 54, the pulse that is produced (corresponding to the location of each reference bar in a horizontal scan line) locates precisely the horizontal position of the bar. Since the distance between the reference bars 54 and 55 is known, and the spacing between the plane formed by these bars and the reference bar 56 is known, the three points corresponding to the points at which the shadow line crosses the reference bars define a plane corresponding to the shadow line falling on the subject 16 (FIGS. 9 and 10). The shadow line corresponds to the bright line 17 of FIG. 2, except that it has a much greater definition, since it is a sharply defined line between light and dark, instead of a thin bright line.

The position of the points at which the shadow line crosses the frame and reference bars 54–56 is determined by the ordinal number of the scan line which first encounters a bright line during the downward scanning of the field of view. Since the shutter 50 is black, the video camera does not produce an output while the top portion of the field of view (as illustrated in FIG. 5) is scanned. As the scanning proceeds downwardly, however, the shadow line on the reference bars 54 and 55 is first detected, after which a portion of the shadow line 60 is detected, along with the point at which the shadow strikes the reference bar 56. As downward scanning continues, beyond the shadow line 60 and the point at which it strikes the reference bar 56, no further light-dark transistion is encountered, and no further useful information is acquired during the rest of this scan.

The information that is useful to the calculation of the z dimension of the three-dimensional points is gained beginning when the shadow strikes the bars 54 and 55, and ending below the shadow line 60 and the point where the shadow line strikes the reference bar 56. It is convenient to store only this amount of the information, together with the ordinal number of the scan lines involved, so that the data storage requirements for the image may be reduced.

Figure 8:
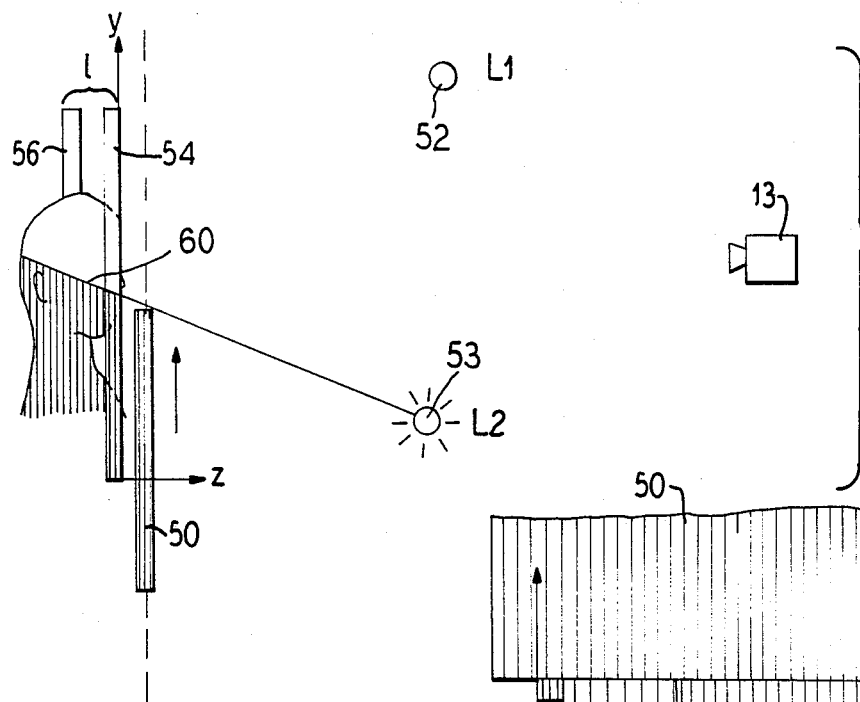

A second point light source 53 is provided located below the level of the camera 54, as illustrated in FIGS. 5 and 6. After the subject 16 has been scanned by downward movement of the shutter, indicating FIG. 5, the shutter is moved up past the subject when the light source 53 is turned on, to produce another shadow line across the surface of the subject, as illustrated in FIG. 8. This allows the video camera to acquire data corresponding to a second scanning plane, at a different angle of incidence, defined by the points in the plane of the shadow line.

Using the apparatus of FIGS. 5 to 8, video images are scanned which incorporate three points for identifying the plane of each scan cycle, and the angle applicable to such scan cycle can be determined in the same manner as described above in connection with FIG. 4.

Since the shutter 54 has its upper and lower edges perpendicular to the direction of movement, and the direction of movement is aligned with the frame and reference bars 54, 55 and 56, the vertical position of the shadow line on the frame bars 54 and 55 will always be equal, so that the analysis described in connection with FIG. 4 may be used directly. If for some reason, it is desirable to provide the shutter 50 with an edge which is not normal to its direction of movement, then the vertical position of the shadow line crossings of the frame bars 54 and 55 will be at different vertical positions, and the three points of the shadow line crossing the reference bars are used to define a plane for each scanning cycle. For each scanning frame, the equation for the plane of the shadow line is calculated, as described above, using the three points where the shadow line crosses the frame and reference bars, where the z dimension is known. Then the z dimension of any point on the shadow line in that scanning frame is determined, using the equation of the plane.

It is apparent that using the apparatus of FIGS. 5-10, improved resolution is obtained because the shadow line is very sharp and distinct, in contrast to the thin bright line 17 illustrated in FIG. 2. The shadow line is readily obtained with a point source in the form of an inexpensive light bulb located a distance away from the shutter 50. The required distance between the subject and the lamp bulb can readily be determined by observing the distinctness of the shadow line on the subject. If the subject can be maintained closely behind the shutter 50, then the location of the point sources 52 and 53 may also be located closer to the shutter 50, without causing the shadow line to lose its distinctness.

Figure 11A:
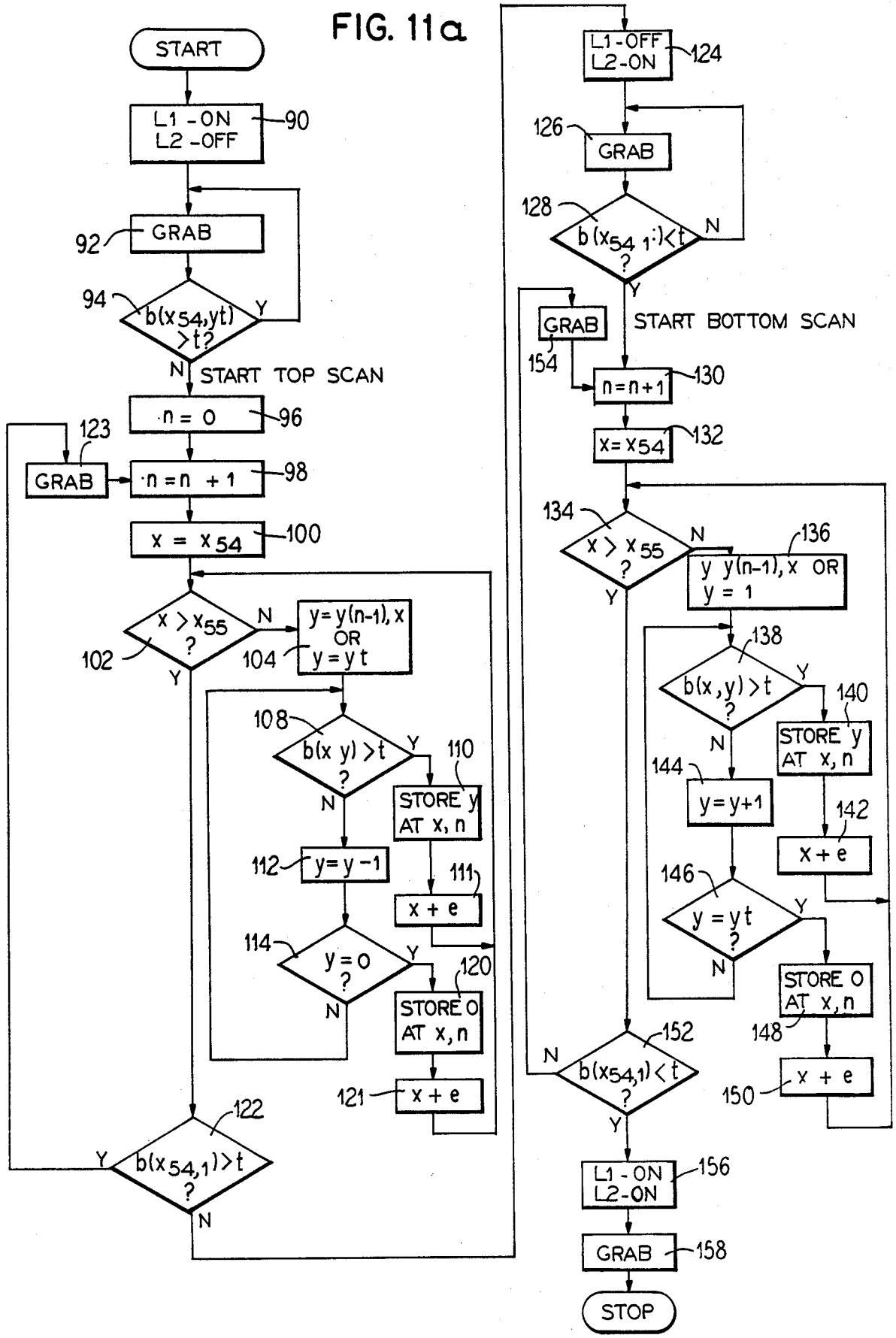
FIGS. 11a–11b illustrate flow charts which indicate the steps executed during operation of the present invention.
Figure 11B:
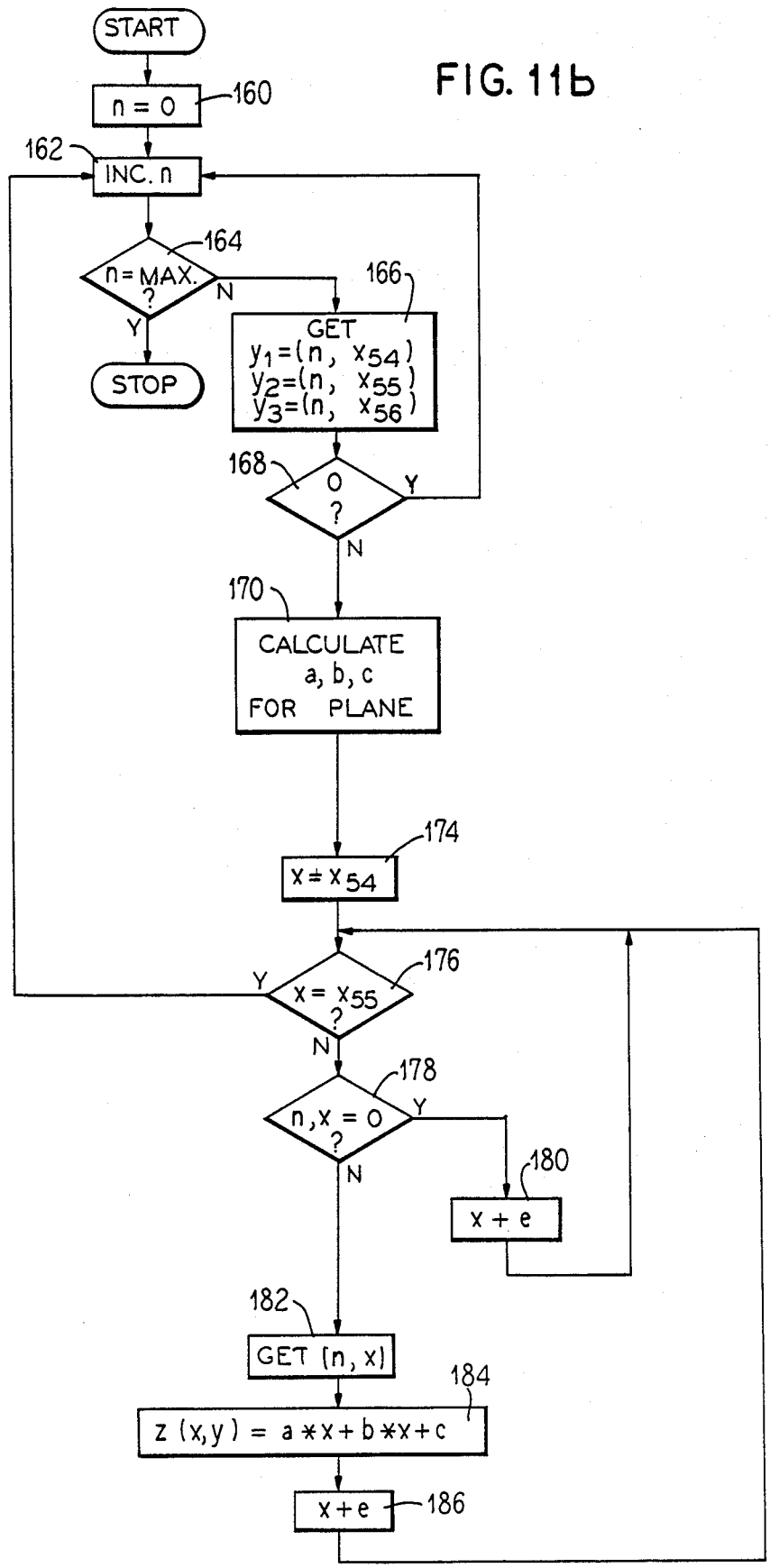

FIGS. 11a-11b illustrate the flow of steps carried out during operation of the apparatus illustrated in FIGS. 5-10, when a digital computer is employed to capture and store the data scanned by the video camera. Preferably, the digital computer employs a video acquisition board, such as one of those currently available on the market, to store the x and y positions of illuminated points within the field of view of the video camera. One such board is the "True Vision" image capture board marketed by AT&T. When such apparatus is used in connection with the apparatus of FIGS. 1 to 3 for example, a memory array is filled with data corresponding to the brightness (in red, green and blue components) of each point within the field of view. The array is mapped to the corresponding x, y position of each point. From this array, a series of data points are made available for storage, corresponding to the x, y positions of each point on the bright line 17, which include the points where the short line cross the frame and reference surface, as well as the bright line 17 on the subject 16.

The y coordinate of each of the data points of each scanning frame is stored in digital storage at a location defined by its frame number and its x coordinate. This operation is accomplished by the steps shown in FIG. 11a, which may be referred to as an extraction procedure, as it extracts the shadow line data from the scanning frames.

When a sequence of scanning frames is extracted, digital storage then contains a series of records, each record corresponding to one scanning frame and containing information corresponding to the scanning angle, together with the x and y coordinates of each point on the bright line 17 or shadow line.

When the extraction is completed, the program shown in FIG. 11b evaluates the z dimension of each stored point, using the techniques described above in connection with FIG. 4. The calculated z dimension of each point is stored in an array, indexed by the x and y dimensions of the stored points. When processing is complete, the array is filled with data corresponding to the three-dimensional dimensions of the subject 16. A record of the color-designating parameters for each point is also stored in memory in an array which is indexed by the x and y positions of each point, and a color index for designating the stored R, G and B parameters for each point.

When the apparatus of FIGS. 5-10 is employed, the same sequence takes place. In this case however, the data which is stored does not correspond to the positions of the bright line 17, but to the positions of the shadow line 60. The x and y coordinates of each point on the shadow line is determined when, for any given x dimension, a y dimension is found for which the brightness is not dark, i.e., greater than a predetermined threshold value t, during a downward scan of the data stored in memory, for the downward scan of FIG. 7. For the following upward scan of FIG. 8, the x, y position of each point on the shadow line is determined when for any given x dimension, a y dimension is found for which the brightness is not dark. Following the scanning sequences of FIGS. 9 and 10, there results in digital storage a series of records, each of which identifies the x, y positions of the shadow line on the frame and reference bars 54-56, which are used for determining the angle of the scanning plane, and the x, y position of each point on the shadow line as it crosses the subject 16. Subsequent manipulation of the data is the same as has been described in connection with FIGS. 1 to 3, the result of which is an array which is filled with the x, y and z coordinates of each scan point on the subject 16, as well as applicable color parameters.

Figure 12:
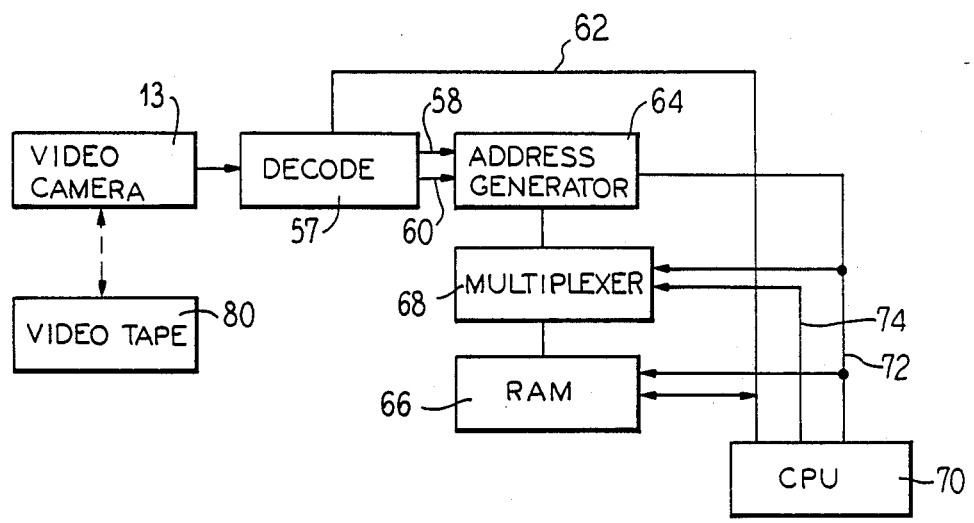
FIG. 12 is a functional block diagram of apparatus for carrying out the invention.

FIG. 12 indicates, in block diagram form, apparatus for carrying out the steps of the present invention. The video camera 13 has its output connected to a decode unit 57, which functions to produce a plurality of outputs identifying the line number 58, or the ordinal number of the horizontal line being currently scanned, the x position 60 of the point currently being scanned on the horizontal line, and signals R, G and B indicating the absolute brightness levels of the red, green and blue light components at the point being scanned, and a brightness luminescence signal b indicating the combined value of the R, G and B signals. The signals R, G, B and b are supplied to a data bus 62.

The outputs 58 and 60 are supplied as inputs to an address generator 64, which identifies the address of a storage location in a random access memory or RAM 66 at which the data corresponding to the currently scanned point are to be stored. This is supplied to the address input of the RAM 66 through a multiplexer 68. The data stored in this location corresponds to the outputs signals R, G, B and b.

The CPU 70 is provided having connections to a control bus 72, an address bus 74, and the data bus 62. The control bus 72 furnishes signals required for the address generator 64 to assign storage locations of each scanning frame at a predetermined location within the RAM 66. The control bus 72 also includes signals for controlling the multiplexer 68 for accessing the RAM 66 either with the address generated partly by the CPU and partly by the address generator 64, or an address supplied to the address bus 74 entirely from the CPU 70. In this way, the CPU 70 is able to control assignment of memory locations (viz. memory management) and to access any part of the RAM 66, independently of the operation of the address generator 64.

The data bus 62 makes it possible for the CPU to receive data in the form of the R, G, B and b signals from the decode unit 57, and also data which may be read out from the RAM 66. The CPU is also able to store data in the RAM 66 by supplying such data over the data bus 62. The control bus 72 supplies signals for controlling the RAM 66 so as to execute reading and writing operations in the conventional fashion.

The units 66-70, and their interconnecting buses 72, 74 and 62, are conventional in all microcomputer systems, and therefore need not be described in detail herein. The decode unit 57 and the address generator 64 are embodied in commercially available equipment which functions to "grab" or get the data from the video camera 13 and place it in a memory array. Using such equipment, a single scanning frame is placed in the RAM 66 at a predetermined location.

The above discussion contemplates that the output of the video camera 13 is processed on an on-line basis, directly from the camera 13. Alternatively, a video tape unit 80 may be employed, with the signals from the camera 13 stored temporarily and then played back, one frame at a time through the decode unit 56.

Figure 13:
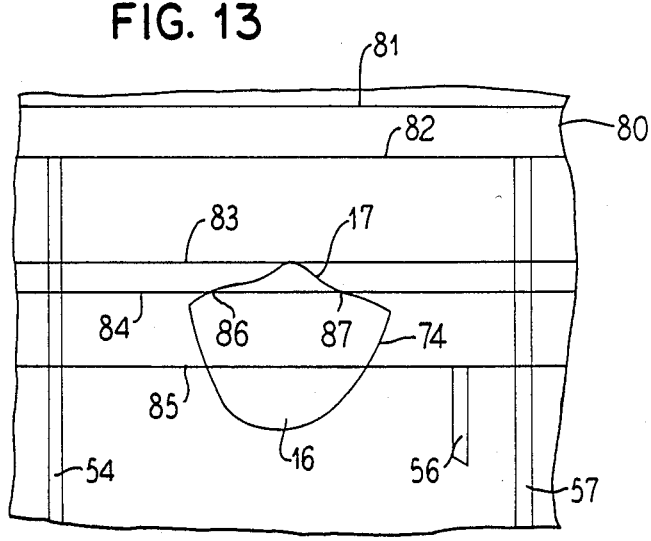
FIG. 13 is an illustration of a scanning frame.

FIG. 13 illustrates the information content of a single scanning frame as seen by the camera 13. The outer rectangle of FIG. 13 illustrates the field of view, which is scanned by horizontal lines such as lines 81-85, from left to right, one line at a time from top toward the bottom. The entire frame is dark, except for the illuminated area of the face of the subject 16, from the shadow line 17 down to the subject's chin. Light from other areas in the field of view is suppressed by the black curtain 50, a black background, and a black cloth draped over the subject's shoulders below his chin.

Line 81 is the top scanning line, and encounters no light area, because it is above the edge of the black curtain 50 (FIGS. 5-8). The scanning lines which follow after line 81 also encounter nothing but black, until line 82 which reaches the shadow line on the reference bars 54 and 55. The horizontal positions of the reference bars is indicated by the locations where the scanning line 82 crosses these bars, indicated by "bright" pulses from the camera 13 occurring at times corresponding to these positions. A later scanning line 83 is the first one to encounter the shadow line 17, which is indicated by a pulse corresponding to a bright area when the scanning line crosses the shadow line 17. Subsequent scanning lines, such as the line 84, cross shadow line 74 at two points, the first of which is represented by dark to light transition at point 86, and later a light to dark transition at point 87. At scanning line 85, the reference bar 56 first appears. As explained above, the output of the video camera 54 is processed by causing digital information to be stored in the RAM 66 corresponding to the entire bright image within the field of view 80. This operation may be referred to as a "grab" operation.

FIG. 11a illustrates the sequence of operations which is carried out by the CPU 70, in order to operate on the data in the RAM 66 which is placed there by the grap operation. Each of the units illustrated in FIGS. 11a and 11b may be taken to represent an operation of a preprogrammed digital computer, or, in the alternative, may represent physical units to accomplish the desired functions, such as counters, decision units, etc.

When the sequence of FIG. 11a receives control, control is passed to a unit 90, which turns on the lamp L1 and turns off the lamp L2, preparatory to downward scanning. Unit 92 then receives control, which grabs the image and enters data corresponding to a single scanning frame into the RAM 66. Then unit 94 receives control, which determines whether there is any point at the horizontal position of the bar 54 (ie., $x_{54}$) which has a brightness level higher than a threshold level t. If so, there is no relevant data in this frame, because the shadow line has not reached the field of view. Then control returns to the unit 94, which grabs the next scanning frame and repeats the process described above.

When a scanning frame is input in which the shadow line strikes the bar 54, then control is passed to a unit 96 which sets an index n=0, and then unit 98 increments the index n to 1. The index n is used to designate the number of the scanning frame, which is used to help define a data storage location in the RAM for the data derived from this scanning frame. Then a unit 100 sets an x parameter equal to $x_{54}$, which corresponds to the left edge of the frame, coincident with the bar 54. Then unit 102 receives control, which determines whether the value of x indicates that the end of the line has been reached (at $x_{55}$ corresponding to the bar 55). If not, unit 104 receives control which sets y equal to yt, for the first frame, a value which corresponds to the top line of the field of view 80 (FIG. 13). Then unit 108 determines whether the brightness of the point located at these x, y dimensions exceeds the threshold brightness t. It so, unit 110 receives control which stores the value of y at the address identified by the frame number n. Then the x parameter is incremented by e in unit 111 (which sets the desired horizontal resolution) and control returns to the unit 102. For subsequent frames, the unit 104 sets y equal to the stored y value for the same x value in the preceding frame.

When the unit 108 determines that the brightness does not exceed the level t (the x, y point is in shadow), then control is passed to the unit 112 which decrements the line number to the next lower scan line, and passes control to unit 114. If y=0, then all scan lines have been processed for the current value of x, and so control can be passed to the unit 120, which stores a 0 or null at the storage location of the RAM 66, corresponding to the current (n, x) point indicating the absence of a shadow line at this x position (i.e. all points at this x position are dark). Then unit 121 increments x by the quality e and control returns to the unit 102, which resumes processing of the current scanning frame, for the next value of x.

It can be seen that the above procedure sets the y value for the storage location (n, x) equal to the first bright point found during a downward inspection of all points having a common x value. Then the x value is incremented and the procedure repeated. Thus the storage locations (n, $x_{54}$) to (n, $x_{55}$) store the y positions for each x point in the shadow line, and on the bars 54-56. When the unit 102 indicates that the horizontal position $x_{55}$ has been reached, control passes to a unit, which determines whether the scanning line 1 elevation of the bar 54 is dark. If so, the downward scanning is complete. Otherwise control passes to unit 123 which grabs the next scanning frame, and then to unit 98, which increments the scanning frame index n and repeats the procedure described above.

When the downward scanning is complete, unit 124 turns L1 off and turns on L2, after which a subsequent operation is performed which is similar to that described above, except that scanning takes place in the upward direction, after the screen 50 has first been lowered to that its upper edge is below the field of view. Unit 126 grabs a scanning frame, and unit 128 determines whether the brightness of the bar 54 at the bottom line (y=1) is dark. If not, the shadow line has not yet risen to the field of view, and unit 126 grabs another scanning frame. Otherwise unit 130 increments the frame index n and unit 132 sets x=$x_{54}$. Then unit 134 determines if x exceeds $x_{55}$ and if not y is set to the lowest scan line by unit 136, or the value of y determined for the corresponding x value in the preceding frame, and unit 138 determines whether the x position at that line is bright. If so, unit 140 stores the y value at the n, x storage location, unit 142 indexes the x value and control returns to unit 134 to repeat the procedure for the next x value. If the x, y location is dark, then unit 144 increments y, and unit 146 determines whether the top line yt has been reached. If not, control returns to unit 138 to check for the shadow line. The unit 144 increments the y value until the shadow line is found, at which time the unit 138 branches to unit 140. If the shadow line does not exist for the current value of x, then unit 146 passes control to unit 148, which stores a 0 or null at the n, x location. Then unit 150 increments x and returns control to unit 134.

When the unit 134 indicates that all x values have been processed, then control is passed to unit 152 which determines whether the shadow line has reached the top line, i.e. point ($x_{54}$, 1) is dark. If not, control passes to unit 154 which grabs another scanning frame and passes control to unit 130, repeating the procedure for all scanning frames with relevant data.

When the upward scan is complete, unit 152 passes control to unit 156, which turns both L1 and L2 on and then unit 158 grabs the fully lit image of the subject, storing the R, G and B signals for each point in the RAM 66, at storage locations which are mapped to the field of view, and from which the relevant R, G, B data may be obtained by the CPU 70 for subsequent display of the image.

When the sequence of FIG. 11a is completed, the sequence of FIG. 11b receives control. Control is first passed to a unit 160 which sets n=0 and then unit 162 increments n. Unit 164 determines whether all of the frames have been processed. If not, control passes to unit 166 which gets the y values corresponding to the points that the shadow plane crosses the bars 54-56 which were stored by the sequence of FIG. 11a at (n, $x_{54}$), (n, $x_{55}$), and (n, $x_{56}$) for this frame n. Then unit 168 determines if any of those points has the null value of 0, and if so, control returns to unit 162, which increments the frame index and the sequence is repeated. Otherwise, unit 170 receives control which performs the algebraic calculations required to solve three simultaneous equations in order to define the shadow plane, from the shadow line points in bars 54-56. This results in the constants a, b and c for the equation describing the shadow plane. Then unit 174 sets x equal to $x_{54}$, the lowest value of interest (corresponding to the left and end of the scanning line within the field of view 80). Then unit 176 receives control, and determines whether x is less than the maximum value $x_{55}$. If so, control is passed to unit 178 which determines whether the x dimension of the point corresponding to the x position on the shadow line of this scanning frame is 0. If so, the shadow line does not exist at this point, and the z dimension need not be calculated. Then control is passed to unit 180, which increments the x dimension and returns control to the unit 170, whereupon the operation is repeated for the next x value.

If the unit 178 determines that the y dimension is not 0, then control is passed to unit 182 which gets the stored y value and then unit 172 calculates and stores (in the RAM 66) the z dimension for the x, y point being processed, defined by the current x value and the y value stored at (n, x) for this scanning frame. Then unit 184 increments the dimension and returns control to the unit 186.

When the unit 176 indicates that all the x points on a shadow line have been processed, so that x approaches the maximum value of $x_{55}$, then control passes to unit 162 which increments n and returns control to unit 164.

Since n represents a frame number, n will be increased progressively until all frames are processed, and the processing is complete, at which time the z dimension of all shadow line points has been calculated and stored.

A two-dimensional display of the image data stored in the RAM 66 may then be made, using conventional techniques, so that the stored image may be viewed from any selected azimuth and elevation. As these techniques are well known to those skilled in the art, they need not be described in detail herein. For example, an operator may be asked to specify angles corresponding to elevation and azimuth, which represent a point of view from which the appearance of the subject 16 is to be viewed. With those angles given, the necessary coordinate rotation is accomplished by acting on each set of three position coordinates with the product of two rotation matrices:

$$\begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} \cos\theta_2 & 0 & \sin\theta_2 \\ 0 & 1 & 0 \\ -\sin\theta_2 & 0 & \cos\theta_2 \end{bmatrix}$$

With these two angles given, the necessary coordinate rotation could be accomplished by acting on each set of three position coordinates with the following product of the two rotation matrices.

This causes the coordinate system to be rotated by an angle $\theta 1$ in elevation, and an angle of $\theta 2$ in azimuth (about the x and y axis, respectively). Then the program steps through the rotated output plane, in increments corresponding to the desired resolution, and locates data points for the rotated x and y coordinates which correspond to each x, y position in the desired output plane (normal to the viewing direction). If more than one such point is found, the point with the largest z (closest to the viewer) is chosen, and its data is transferred to a portion of the RAM 66 corresponding to that x, y position of the output plane. When all of the points are processed in this way, the RAM 66 contains data corresponding to the points to be represented in rotated form, in a regular matrix, which may be read out and displayed in the conventional way, using conventional bit mapped memory techniques.

It is desirable to calculate, for each point, the inwardly pointing vector which is normal to the surface being displayed. The partial derivative functions which are required for this are:

$$Dx = \frac{1}{e}[z(x+e,y) - x(x,y)]$$

$$Dy = \frac{1}{e}[z(y,z+e) - z(x,y)]$$

where x, y and z correspond to the x, y, z dimensions of a given point, and e is a constant determined by the resolution desired for the displayed image. Then the coordinates of the inward pointing unit vector normal to the surface is:

$$\hat{n}(x,y) = [Dx^2 + Dy^2 + 1]^{-\frac{1}{2}}(Dx, Dy, -1).$$

At the completion of this step, data has been assembled corresponding to x, y and z dimensions of each point being displayed in the rotated image, as well as the inward unit vector normal to the surface at this point.

The operator may then chose an angle of illumination, so that the subject is displayed with illumination from a given direction. The unit vector of the direction of incoming light is specified, using angles of azimuth and elevation which may be input by the operator.

The operator may also choose the intensity with which the subject appears to be illuminated (as displayed) or may chose individually the intensities for the three R, G, B color components, if color illumination is desired. Then the intensity of each point to be displayed may be calculated by taking the product of the defined intensity and the cosine of the angle that it makes with the surface at a given point. If the intensity of the additive color components is specified individually, then the intensity of the each components is controlled individually in this manner, for each point to be displayed.

If the subject is to be displayed with multiple light sources, the above procedures may be carried out for each source, and the several color intensities added at each point.

Optionally, the user may specify a "diffusness parameter" for each light source, which tends to even out the illumination of the subject as displayed in the final image. If desired, gloss effects may also be added, as a result of which the apparent intensity of the displayed image is increased when the surface is positioned so as to reflect the presumed light source directly toward the viewer.

If desired, shadows resulting for example from the eye sockets or the nose or an individual may be represented, by altering the displayed intensity at appropriate locations on the face of the subject 16.

The displayed images may be shown in altered fashion by selective combinations of two stored images. For example if one face is stored in the RAM 66 as a set of coordinates $z_1(x,y)$, and a second face is stored in a different portion of the RAM 66 as values $z_2(x,y)$, then any selected combination of the two faces may be displayed simultaneously by the expression $$z_3(x,y) = z_1(x,y) + \alpha[z_2(x,y) - z_1(x,y)]$$

where $\alpha$ is a factor which determines the relative amount of the second image which is displayed. When $\alpha = 0$, then the image is identical to the first stored image. When $\alpha = 1$, then the image is identical to the second stored image. When $\alpha$ assumes an intermediate value, then the displayed image has a shape which is a combination of the first and second stored images. In this way, by selection of a specific value for $\alpha$, and a variation along a continuum may be displayed, between the first and second images.

Because the processing of the scanned image begins at the y value found for the preceding frame for each value of x, and ends at the shadow line, the shutter 50 may be narrower than the height of the head of the subject, or the height of the image which is being processed. Each initial y value is in shadow, because of the unidirectional movement of the shutter, and processing proceeds rapidly because there is usually a relatively small differential in the y values for successive frames.

At the end of the downward scan of the shutter 50, the shutter must continue its downward motion, so that the upward scan can be made with the upper edge of the shutter. Because the shutter can be made narrow however, this represents only a short interval between the downward and upward scans.

Because no trigonometric or transcendental quantities must be calculated, processing to develop the coordinates of the shadow plane in each frame also may be carried on rapidly. An accurate calculations is made of the shape of the object which is independent of the precise spatial positions or orientations of the subject frame, camera, or light sources.

The shutter arrangement is inexpensive and does not require special light sources, since ordinary lamp bulbs may be used. The shadow line is sharply defined simply by making the shutter-to-subject distance small in relation to the light-to-subject distance, which may be readily done, without need for any precision in the placement of the light source.

In another embodiment of the present invention shown in FIG. 14, the frame 10 may be omitted. The frame 10 is made unnecessary by storing the relative position of the shutter in association with data for each frame, as such data is written into memory. The relative position of the shutter is determinable by counting the number of cycles of operation of the stepping motor which moves the shutter, from a predetermined initial position.

It is also possible to revove the effect of different positions of the light sources, by maintaining the light sources in a fixed position. In this way the position of the light source is known in advance, and does not affect the calculations involved in reducing the observable image to X,Y,Z coordinates. Then the Z dimension for any X,Y point of a given frame of the video camera data is determined by the formula $Z = L*(x/d - 1)$, where L is the fixed distance from the light L1 to the shutter and d is the distance between the edge of the shutter and a line drawn through the light L1, perpendicular to the direction of movement of the shutter, determined by counting the cycles of operation of a stepping motor, multiplying the counted number by a scale factor, if necessary, and adding the product to a quantity corresponding to the initial position of the shutter. The position of the second light source L2 is also fixed, at a distance L from the plane of the shutter, so the same expression is used to derive the Z dimension for both light sources.

The caluclations described above are performed in the same manner as described in connection with FIG. 11, but the determination of the Z dimension for any point wiht a given X,Y dimension is simplified.

It will be appreciated that since only one edge of the shutter is significant to the process of digitizing the object under inspection, the shutter can be made narrow. It is sufficient that the shutter is merely wide enough to cast a shadow with a definitive edge, so that the light-dark transition in the image captured by the video camera can be noted in later processing.

FIG. 15 shows a perspective view of a shutter assembly in which a thin shutter is mounted at its two ends to belts 202 and 204 supported by sprockets 206. Two of the sprockets 206 are driven by a drive shaft 208 turned by a stepping motor 210, which rotates through a given small angle for each pulse supplied from a pulse generator 212. The pulse generator is started by a signal on a control line 214 supplied by a computer or the like when an image is to be acquired. The pulses are supplied to the motor 210 over a line 216, and are also supplied as inputs to a counter 218. The counter is preset to zero or to an appropriate offset value by signals on a line or bus 220, so that the state of the counter on a line or bus 220 indicates the current value of d. When the movement of the shutter is slow, the same value of d is correct for all points in a given frame as acquired by the video camera.

It is apparaent that the present invention provides a simple and economical apparatus and method for acquiring data corresponding to an accurate digital model of a scanned subject. Various modifications and additons may be made in the apparatus and methods of the present invention without departing from the essential features of novelty thereof, which are intended to be defined as secured by the appended claims.

What is claimed is:

1. Apparatus for acquiring digital data corresponding to a three-dimensional visual object comprising a frame opening for defining a field of view located in proximity to said three-dimensional image but in no fixed positional relationship thereto, means for scanning the object with a visual scanning plane which forms a line intersection with said object and with the plane of said frame opening, a reference surface positioned in the proximity of said object within said field of view for manifesting a point within said scanning plane, digital storage means, a video camera for producing signals comprising a scanning frame corresponding to the locus of the intersection of said scanning plane with the surface of said object and with said reference surface, means for storing said signals in said digital storage for a plurality of scanning frames for different angles of incidence of said scanning plane with the plane of said frame, and means for deriving the z dimension of each point of said line intersection for each scanning frame, whereby said digital storage means stores the x, y, z dimensions of each point on the surface of said object which is scanned.

2. Apparatus according to claim 1 wherein said frame opening is defined by at least one reference bar, said reference bar being transverse to the direction of scanning, whereby the angle of said scanning plane, relative to said frame opening, for any scanning frame may be determined by the x, y positions of the points at which said scanning beam crosses said reference surface bar and said reference bar.

3. Apparatus according to claim 2 wherein said reference surface bar is aligned and parallel to said reference bar, and spaced therefrom by a fixed distance.

4. Apparatus according to any of the preceeding claims in which said scanning plane is formed as the shadow line of a shutter which is moved across said field of view.

5. Apparatus according to claim 4 including a fixed point source spaced from said shutter on the opposite side of said object.

6. Apparatus according to claim 5 wherein said shutter has a straight edge for generating said shadow line which is perpendicular to the direction of the movement of said shutter.

7. Apparatus according to claim 6 including a second point source located on the other side of said shutter from said object, and spaced from said first point source for defining a shadow line striking said object at a different angle.

8. Apparatus according to claim 7 wherein said shutter incorporates two shadow defining edges, both of said edges being perpendicular to the direction of movement of said shutter, and means for moving said shutter in one direction so that one edge forms a shadow line during scanning when said first light source is energized, and said other edge forming a shadow line when said shutter moves in the opposite direction and said second light source is energized.

9. A method of acquiring positional data corresponding to a scanned three-dimensional object, comprising the steps of placing the object within a field of view defined by a reference frame opening with no particular positional relation relative to said reference frame opening, placing a reference line in said field of view in a fixed position relative to said frame opening, illuminating said subject simultaneously with a planar scanning beam making a line intersection with the surface contour of said object and a point of intersection with a reference line parallel to said frame opening, using a video camera to produce electrical signals corresponding to the x, y position of the line of intersection of the scanning plane with said object and with said reference line, sweeping across said object with said scanning plane while making successive records of the x, y positions of said intersection line with said video camera, repeating the scanning with a beam forming a different angle of incidence with said frame opening, and using the points of intersection of said scan plane with said reference line to identify the z dimension of each point of said object which is scanned by said scanning beams, and digitally storing the x, y, z positions of each of said points.

10. Apparatus for acquiring digital data corresponding to a three-dimensional visual object comprising means for defining a field of view of said three-dimensional image, means for scanning the object with a visual scanning plane which forms a line intersection with said object, digital storage means, a video camera for producting signals comprising a scanning frame corresponding to the locus of the intersection of said scanning plane with the surface of said object, means for storing said signals in said digital storage for a plurality of scanning frames for different angles of incidence of said scanning plane with the plane of said frame, means for deriving the Z dimension of each point of said line intersection for each scanning frame, whereby said digital storage means stores the X,Y,Z dimensions of each point on the surface of said object which is scanned, said scanning plane being formed as the shadow line of a shutter which is moved across said object between said object and said camera.

11. Apparatus according to claim 10 wherein said shutter has a straight edge for generating said shadow line which is perpendicular to the direction of the movement of said shutter.

12. Apparatus according to claim 11 including first and second light sources located on the other side of said shutter from said object, and spaced apart for defining two shadow lines striking said object at different angles.

13. Apparatus according to claim 12 wherein said shutter incorporates two shadow defining edges, both of said edges being perpendicular to the direction of movement of said shutter, and means for moving said shutter in one direction so that one edge forms a shadow line during scanning when said first light source is energized, and said other edge forming a shadow line when said shutter moves in the opposite direction and said second light source is energized.

14. Apparatus according to claim 13, including means for storing a representation of the initial position of said shutter relative to one of said light sources, and wherein said means for deriving the Z dimension of each point is responsive to the position of said shutter relative to said stored representation of said initial position.

15. A method of acquiring positional data corresponding to a scanned three-dimensional object, comprising the steps of placing the object within a field of view of a video camera with no particular positional relation relative to said camera, illuminating said subject simultaneously with a planar scanning beam making a line intersection with the surface contour of said object, storing data corresponding to the initial position of said scanning beam relative to said object, using said video camera to produce elecrical signals corresponding to the X,Y position of the line of intersection of the scanning plane with said object and with a reference line, sweeping across said object with said scanning plane while making successive records of the X,Y positions of said interseciton line with said video camera, repeating the scanning with a beam forming a different angle of incidence with said object, and using the points of intersection of said scan plane and said stored data to identify the Z dimension of each point of said object which is scanned by said scanning beams, and digitally storing the X,Y,Z positions of each of said points.

* * * * *